(12) United States Patent
Cikalo et al.

(10) Patent No.: US 10,328,940 B2
(45) Date of Patent: Jun. 25, 2019

(54) SECURE IDLE FOR A VEHICLE GENERATOR

(71) Applicant: Ford Global Technologies, LLC, Dearborn, MI (US)

(72) Inventors: James Theodore Cikalo, Farmington Hills, MI (US); Daniel M. King, Northville, MI (US); Thomas Lee Miller, Ann Arbor, MI (US); Kevin Thomas Hille, Plymouth, MI (US); Micheal Nikiforuk, Royal Oak, MI (US); Scott Alan Watkins, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 48 days.

(21) Appl. No.: 15/461,102

(22) Filed: Mar. 16, 2017

(65) Prior Publication Data
US 2018/0265088 A1  Sep. 20, 2018

(51) Int. Cl.
*B60W 10/06* (2006.01)
*B60W 30/18* (2012.01)
*B60W 10/30* (2006.01)
*B60W 50/14* (2012.01)

(52) U.S. Cl.
CPC ...... *B60W 30/18054* (2013.01); *B60W 10/06* (2013.01); *B60W 10/30* (2013.01); *B60W 50/14* (2013.01); *B60W 2050/146* (2013.01); *B60W 2540/06* (2013.01); *B60W 2540/16* (2013.01); *B60W 2710/065* (2013.01); *B60W 2710/305* (2013.01); *Y10T 477/68* (2015.01)

(58) Field of Classification Search
CPC .......... Y10T 477/68; B60W 30/18054; B60W 10/30; B60W 50/14; B60W 10/06; B60W 2050/146; B60W 2540/06; B60W 2540/16; B60W 2710/065; B60W 2710/305
USPC .......................................... 180/53.8; 701/36
See application file for complete search history.

(56) References Cited

U.S. PATENT DOCUMENTS

| 4,785,227 A | 11/1988 | Griffin |
| 5,670,831 A | 9/1997 | Georgiades |
| 6,060,981 A | 5/2000 | Landes |

(Continued)

FOREIGN PATENT DOCUMENTS

FR  2994407 B1  12/2016

OTHER PUBLICATIONS

Search Report dated Aug. 22, 2018 for GB Patent Application No. GB 1803943.8 (6 pages).

(Continued)

*Primary Examiner* — Roger L Pang
(74) *Attorney, Agent, or Firm* — Frank Lollo; Neal, Gerber & Eisenberg LLP; James P. Muraff

(57) ABSTRACT

Method and apparatus are disclosed for secure idle for a vehicle generator. An example vehicle includes an outlet external to the vehicle, a power inverter dedicated to supplying AC power to the outlet, and a powertrain control module. The powertrain control module controls the power inverter to supply first power level when a switch is in a first position and a second power level when the switch is in a second position. Additionally, the powertrain control module, after entering a secure mode, controls an engine to remain idling when an ignition switch is off.

20 Claims, 4 Drawing Sheets

(56) References Cited

U.S. PATENT DOCUMENTS

| | | | |
|---|---|---|---|
| 6,131,060 A * | 10/2000 | Obradovich | B60G 17/0195 |
| | | | 307/10.1 |
| 7,078,828 B2 | 7/2006 | Suzuki | |
| 9,132,805 B1 | 9/2015 | King et al. | |
| 9,694,684 B2 * | 7/2017 | Enomoto | B60L 1/006 |
| 2005/0109550 A1 | 5/2005 | Buglione et al. | |
| 2011/0146621 A1 * | 6/2011 | Weisz | B60W 30/18054 |
| | | | 123/339.18 |
| 2013/0297129 A1 * | 11/2013 | Ang | B60K 6/445 |
| | | | 701/22 |
| 2015/0274151 A1 | 10/2015 | Wright et al. | |
| 2018/0141456 A1 * | 5/2018 | Maeda | B60L 11/12 |
| 2018/0251121 A1 * | 9/2018 | Jorgensen | B60W 20/50 |

OTHER PUBLICATIONS

Search Report dated Dec. 13, 2018 for GB Patent Application No. GB 1803943.8 (3 pages).

* cited by examiner

10,328,940 B2

SECURE IDLE FOR A VEHICLE GENERATOR

TECHNICAL FIELD

The present disclosure generally relates to vehicle power systems and, more specifically, secure idle for a vehicle generator.

BACKGROUND

Automotive manufacturers are starting to introduce alternating current (AC) power outlets to the bed of trucks for customer usage. This enables the customer to use the vehicle as a generator to power electrical devices, such as power tools or appliances. For example, a contractor may desire to operate power tools or a customer may desire to use appliances on a remote camping trip or at a tailgate event. To prevent battery depletion, the vehicle must be in the "run" position to provide power (e.g., via hybrid electric vehicle (HEV) or fossil fuel). Because the outlets are on the exterior of the vehicle, the vehicle may be left in the "run" position while unattended. Any vehicle left running unattended may be stolen.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for secure idle for a vehicle generator. An example vehicle includes an outlet external to the vehicle, a power inverter dedicated to supplying AC power to the outlet, and a powertrain control module. The powertrain control module controls the power inverter to supply first power level when a switch is in a first position and a second power level when the switch is in a second position. Additionally, the powertrain control module, after entering a secure mode, controls an engine to remain idling when an ignition switch is off.

An example method of supplying power to an external outlet of a vehicle includes supplying, when a key is in an ignition switch, AC power at a first level when a first switch is toggled to a first setting. The example method also includes supplying, when the key is in the ignition switch, the AC power at a second level when the first switch is toggled to a second setting. Additionally, the example method includes supplying, when the key is not in the ignition switch, the AC power at the second level when a second switch is toggled to a secure position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
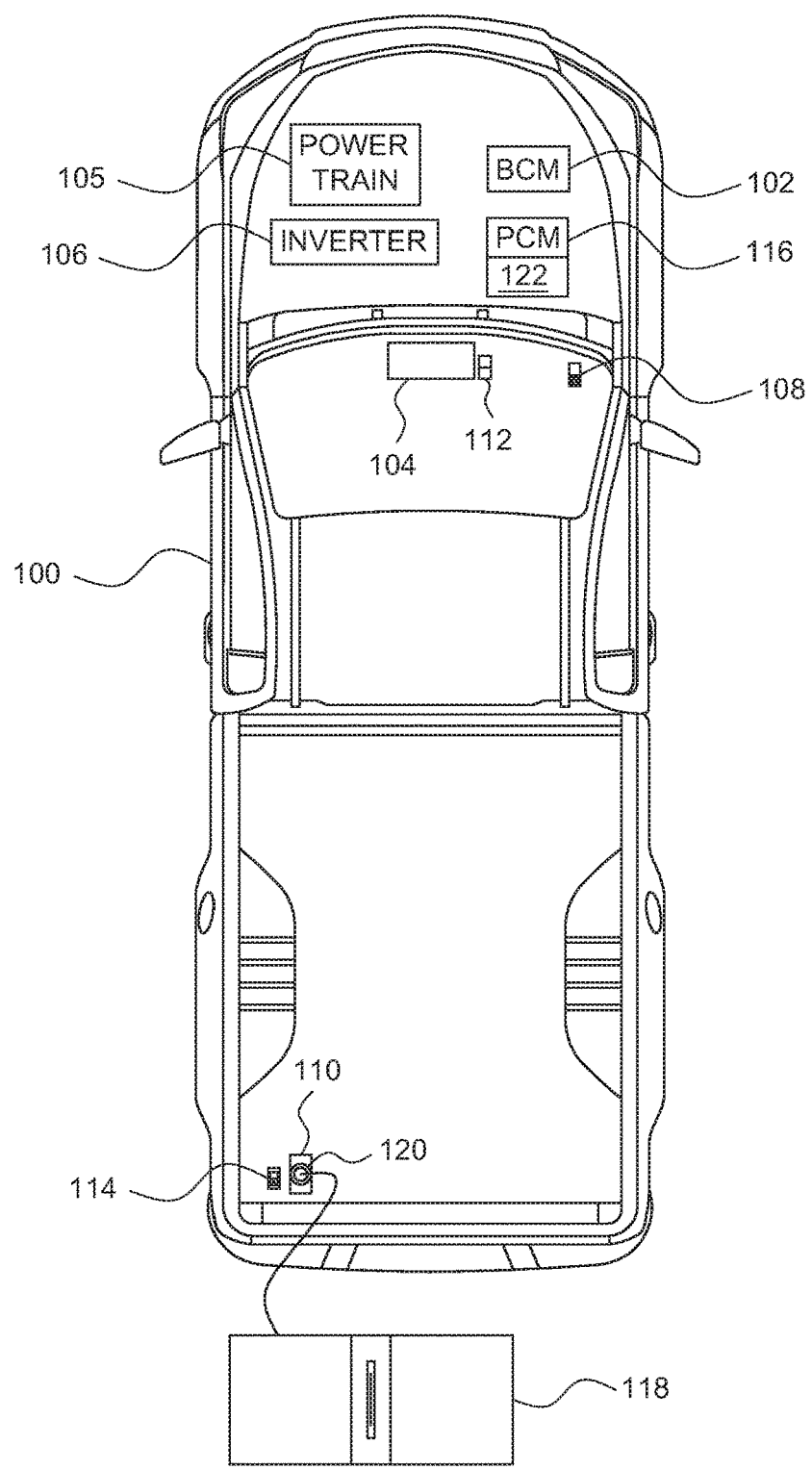
FIG. 1 illustrates a vehicle with a secure idle in accordance with the teachings to this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Securing a vehicle while the vehicle is unattended and idling presents challenges. If the vehicle is equipped with a separate key and FOB, the user can separate the two. The user could keep the key in the ignition with the engine running and use the FOB to lock/unlock the vehicle. Alternatively, the vehicle user can carry a spare key to manually lock/unlock the vehicle. However, in these situations, a perpetrator could break into the vehicle (e.g., by using a custom device or breaking the window) and drive away. Keyless systems do not require a physical key and cylinder switch to operate the vehicle. Rather, these keyless systems use a proprietary wireless protocol between the vehicle and a remote key fob to operate the vehicle. However, these systems do not facilitate idling while the key fob is outside of the vehicle.

As disclosed below, secure idle facilitates a user placing a vehicle in a secure power generating mode that will prevent an unauthorized user from driving away in an unattended vehicle. A powertrain control module (PCM) controls the operation of the powertrain of the vehicle. The powertrain includes an security handler that secures the vehicle while the vehicle is idling. The security handler maintains various states: (a) a low power voltage alternating current (LVAC) state, (b) an unsecured high power voltage alternating current (UHIVAC) state, (c) a partially secured high power voltage alternating current (PSHIVAC) state, (d) a secured high power voltage alternating current (SHIVAC) state, (e) an authentication state (AUTH), and (f) a post high power voltage alternating current (PHIVAC) state. By transitioning through these states, the security handler secures the vehicle while idling to prevent an unauthorized user from driving away in an unattended vehicle.

In the LVAC state, the vehicle supplies low power (e.g., 100 to 400 Watts, etc.) to the internal and external AC outlets. In the UHIVAC state, the vehicle supplies high power (e.g., 2000 Watts, etc.) to internal and external AC outlets and the idle is not secured. In the PSHIVAC state, the vehicle continues to supply high power while waiting confirmation to enter a secured state. In the SHIVAC state, the vehicle continues to supply high power and the idle is secured (e.g., the gear shift selector is locked and the vehicle automatically shuts down the engine if the transmission is shifted out of "PARK"). In the AUTH state, the vehicle determines whether a valid key is present in the ignition. In the PHIVAC state, the vehicle shuts down the vehicle when the user does not produce the authorized key within an amount of time (e.g. 30 to 60 seconds, etc.). As disclosed below, the security handler transitions between the states based on different inputs from switches and sensors from around the vehicle.

FIG. 1 illustrates a vehicle 100 with a secure idle in accordance with the teachings to this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a body control module (BCM) 102, an instrument panel cluster (IPC) 104, a powertrain 105, a power inverter 106, an internal outlet 108, an external outlet 110, an internal switch 112, an external switch 114, and a powertrain control module (PCM) 116.

The body control module 102 controls various subsystems of the vehicle 100. For example, the body control module 102 may control power windows, power locks, an immobilizer system, and/or power mirrors, etc. The body control module 102 is electrically coupled to circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 102 controls a brake transmission shift interlock (BTSI), which prevents the gear selector from shifting out of "PARK." Additionally, the body control module 102 detects (a) the position (e.g., "PARK," "REVERSE," "NEUTRAL," DRIVE," and "LOW," etc.) of a gearshift (not shown), (b) the state (e.g., "OFF," accessory ("ACC"), and "ON") of an ignition switch (not shown), (c) the status of the powertrain, and (d) the status of the vehicle power system.

The instrument panel cluster 104 provides an interface between the vehicle 100 and a user. The instrument panel cluster 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the instrument panel cluster 104 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.) to provide information to the user and accept input from the user. In such examples, the instrument panel cluster 104 displays the infotainment system on, for example, the center console display.

The instrument panel cluster 104 includes menu options regarding operating the secure idle and displays statuses of the inputs of the secure idle. The instrument panel cluster 104 includes the internal switch 112. The internal switch 112 facilitates toggling between providing low power, high power, and secured high power to the outlets 108 and 110. In some examples, the internal switch 112 is a physical switch (e.g., a three-way rocker switch, a toggle switch, a dial, etc.). Alternatively, in some examples, the internal switch 112 is a soft switch with which the user interacts on the center console display. In some such examples, access to the soft switch is protected by credentials, such as a password, a passcode, a personal identification number, and/or a biometric reader, etc.

The powertrain 105 generates power and delivers that power to the electrical system of the vehicle 100 and the wheels of the vehicle 100. The powertrain 105 includes, for example, the engine, the transmission, the drive shafts, and/or the differentials etc. In a standard vehicle, the powertrain 105 generates power based on the revolutions per minute (RPM) of the engine. The RPM of the engine may be controlled by a throttle stop or an idle air bypass control stepper motor. In an electric vehicle, the power to the outlets 108 and 110 is controlled by a battery power control system that regulates power from the high voltage battery of the vehicle 100.

The power inverter 106 changes the direct current (DC) power of the power systems (e.g., the battery, the alternator, etc.) of the vehicle 100 into AC power. The power inverter 106 supplies low power (e.g., 100-400 Watts, etc.) and high power (e.g., at least 2000 Watts, etc.). The power inverter 106 includes load detection to detect when an appliance 118 is drawing power from the power inverter 106. Additionally, the power inverter 106 monitors plug-in detectors 120.

The outlets 108 and 110 are electrically connected to the power inverter 106 via a power bus of the vehicle 100. The outlets 108 and 110 may be any suitable power socket (e.g., type B, type F, type G, etc.). The internal outlet 108 is within the cabin of the vehicle 100. In some examples, the internal outlet 108 is proximate the internal switch 112. The external outlet 110 is on the exterior of the vehicle 100. In some examples, the external outlet 110 is in a bed of the vehicle 100 proximate a tailgate. The external outlet 110 includes the plug-in detector 120 to detect when the appliance 118 is plugged into the external outlet 110. In some examples, the external switch 114 is proximate the external outlet 110. The external switch 114 includes two positions to toggle between low power and high power settings. In some examples, the external switch 114 cannot be used to transition into the secured high power mode. Alternatively or additionally, in some examples, the appliance 118 is incorporated into the vehicle 100. For example, the appliance 118 may be a lift or a cherry picker. In such examples, the appliance 118 is integrated into the bed of the vehicle 100 and is directly electrically coupled to the power inverter 106 instead of via the external outlet 110.

The powertrain control module 116 controls the ignition, fuel injection, emission systems, transmission and/or the brake system of the vehicle 100. The powertrain control module 116 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. Additionally, the powertrain control module 116 has a motive mode and a non-motive mode. In the motive mode, powertrain control module 116 controls the vehicle 100 as normal and facilitates the operation and driving of the vehicle 100. In the non-motive mode, the powertrain control module 116 shuts of the engine of the vehicle 100 when the engine is running and the gear selector is shifted out of the "PARK" position.

The powertrain control module 116 includes an security handler 122. As disclosed FIGS. 3 and 4 below, the security handler 122 monitors inputs (e.g., the switches 112 and 114, the input into the instrument panel cluster 104, the plug-in detector, the gear selector position, the ignition switch position, etc.) to control whether the vehicle 100 is operating with a secure idle.

Figure 2:
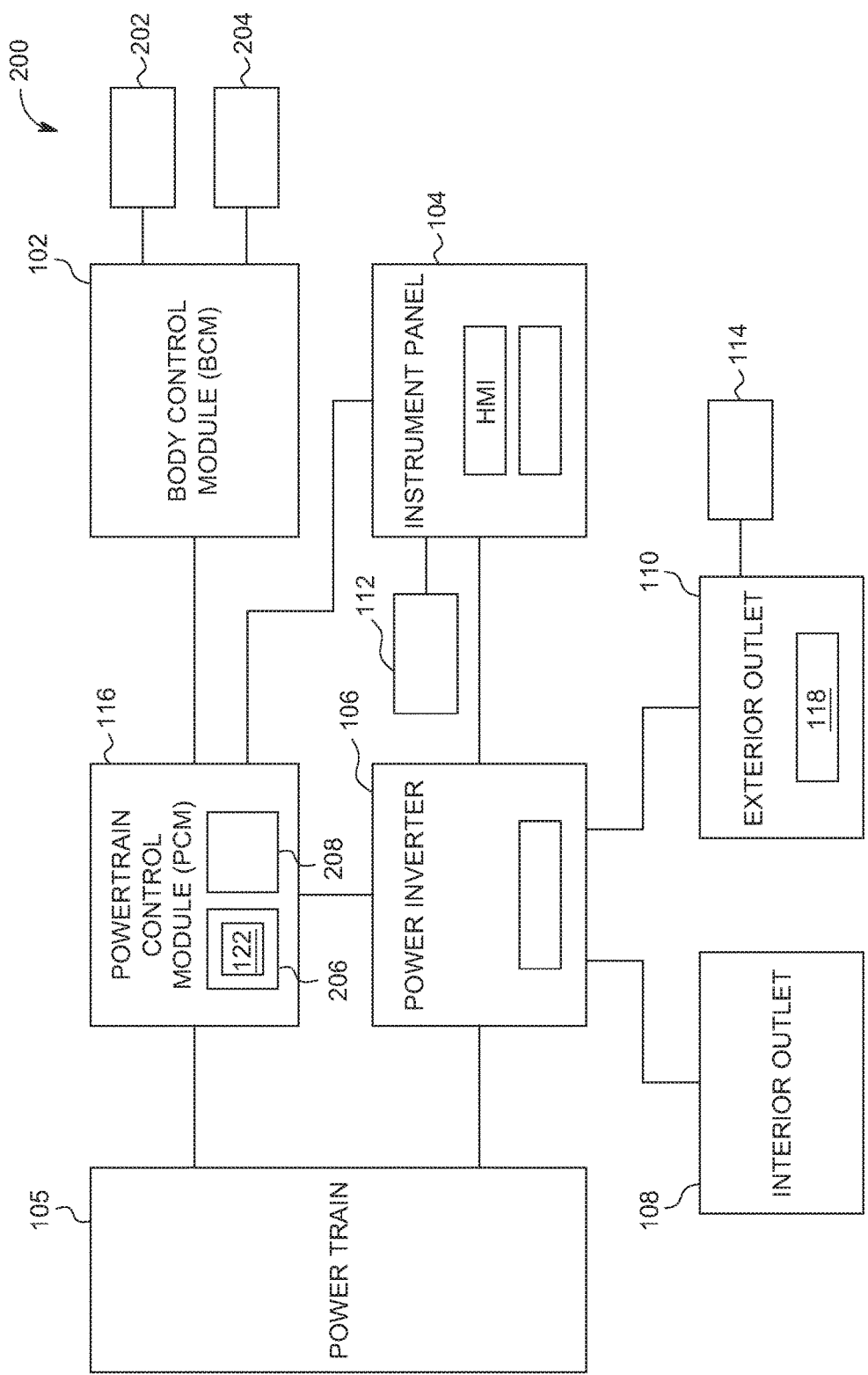
FIG. 2 is a block diagram of electronic components of the vehicle of FIG. 1.

FIG. 2 is a block diagram of electronic components 200 of the vehicle 100 of FIG. 1. In the illustrated example, the electronic components includes the body control module 102, the instrument panel cluster 104, the power inverter 106, the internal outlet 108, the external outlet 110, the internal switch 112, the external switch 114, the powertrain control module 116, an ignition switch 202, and a brake transmission shift interlock 204.

The powertrain control module 116 includes a processor or controller 206 and memory 208. In the illustrated example, the powertrain control module 116 is structured to include security handler 122. The processor or controller 206 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 208 includes multiple kinds of memory, particularly volatile memory and non-volatile memory.

The memory 208 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "tangible computer-readable medium" should be understood to include a single medium or multiple media. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The powertrain control module 116 sends control signals to a powertrain 105. The powertrain control module 116 also sends the status of the secure idle to the instrument panel cluster 104 to be displayed on the outputs (sometimes referred to as the "human machine interface (HMI)") of the instrument panel cluster 104. Additionally, the powertrain control module 116 receives the status of the secure idle from the body control module 102.

The body control module 102 detects the position of the ignition switch 202 and controls the brake transmission shift interlock 204. The brake transmission shift interlock, when engaged, prevents the transmission being shifted out of the "PARK" setting. For example, if the security handler 122 is in the SHIVAC state, the body control module 102 engages the brake transmission shift interlock 204 to prevent the transmission from being shifted out of the "PARK" setting. The body control module 102 sends the position of the gear selector, the position of the ignition switch 202, and the status of the secure idle to the powertrain control module 116.

The powertrain control module 116 monitors the actual gear position in the transmission and the body control module 102 monitors the position of the gear selector. Once in Secure Idle, the body control module 102 monitors the position of the ignition switch and negotiates the exit of Secure Idle with the powertrain control module 116 once the key is returned to the ignition. The criteria for determining a return of the key is different based on whether the ignition system is a conventional bladed key or a pushbutton start ignition.

The instrument panel cluster 104 sends the selections from the HMI and/or the position of the internal switch 112 to the powertrain control module 116.

The power inverter 106 receives DC power from the powertrain via a power bus. The power inverter 106 supplies AC power to the outlets 108 and 110. The power inverter 106 receives the status of (a) the plug-in detector 120 and (b) the external switch 114 from the external outlet 110. The status of the plug-in detector 120 is sent to the instrument panel cluster 104. The status of the external switch 114 is sent to the powertrain control module 116. Additionally, the power inverter 106 detects when the appliance 118 is drawing power from one of the outlets 108 and 110. For example, the power inverter 106 may include current monitoring circuitry to determine when the appliance 118 is plugged in. The power inverter 106 sends the status of the load detection to the powertrain control module 116.

The powertrain control module 116, the body control module 102, the instrument panel cluster 104, and the power inverter 106 are communicatively coupled by one or more data buses. The data bus(es) may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
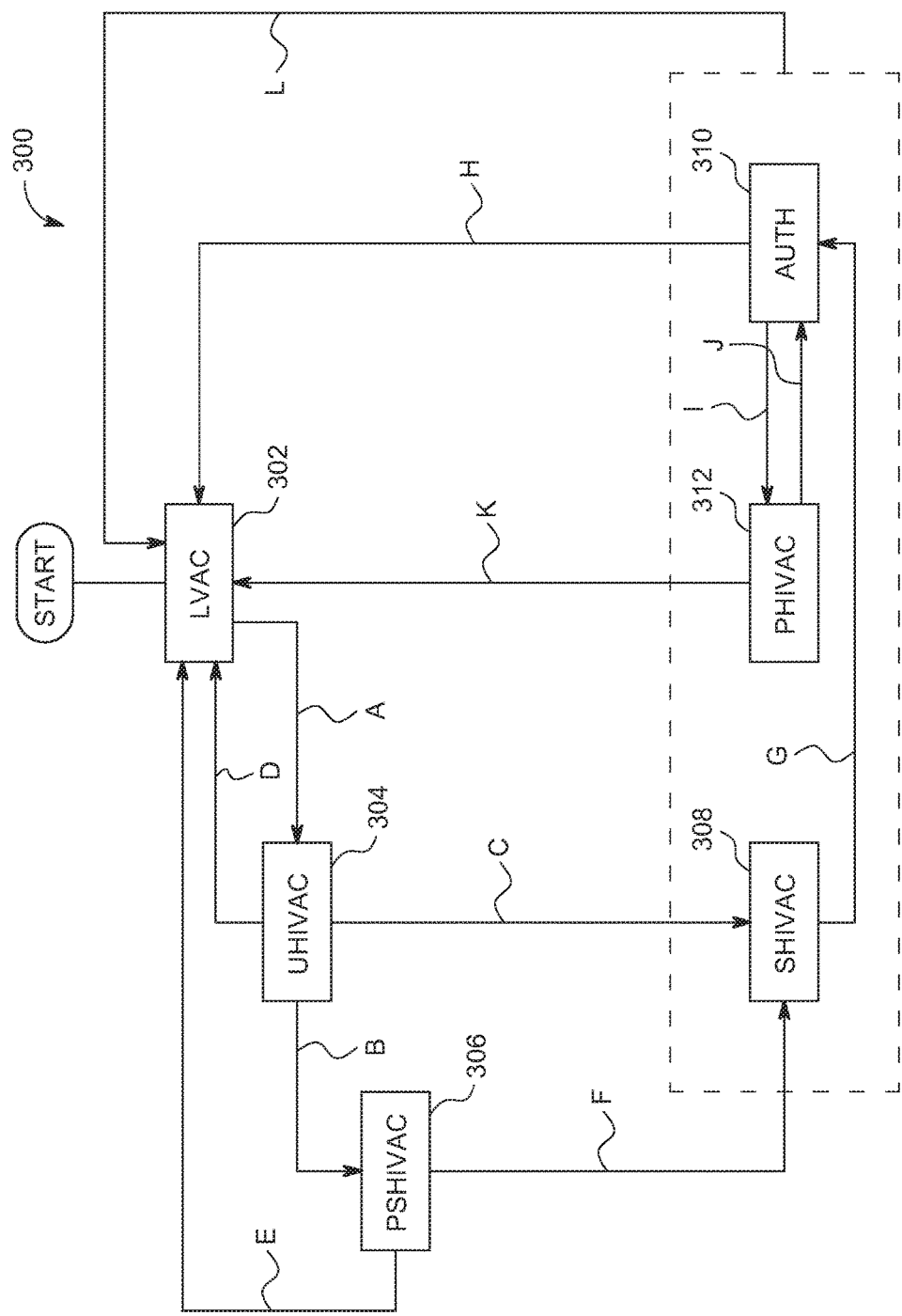
FIG. 3 is a state diagram depicting a powertrain control module providing power through a secure idle.

FIG. 3 is a state diagram 300 depicting a powertrain control module 116 providing power through a secure idle. Initially, the security handler 122 defaults to the low power voltage alternating current (LVAC) state 302. In the LVAC state 302, (a) the power inverter 106 supplies low power to the outlets 108 and 110, and (b) the vehicle 100 operates as usual. Additionally, if the plug-in detector 120 detects the appliance 118 plugged into the external outlet 110 and the gear selector is shifted out of the "PARK" setting, the instrument panel cluster 104 displays a warning.

As indicated by "A" on FIG. 3, the security handler 122 transitions from the LVAC state 302 to the unsecured high power voltage alternating current (UHIVAC) state 304 when (a) the gear selector is in the "PARK" position, (b) the ignition switch 202 is in the "RUN" position, (c) one of the switches 112 and 114 is toggled to the high power mode, (d) power is available (e.g., the vehicle 100 has enough fuel and/or battery charge to support supplying high power), and (e) the UHIVAC state 304 is enabled (e.g., via the instrument panel cluster 104).

In the UHIVAC state 304, the power inverter 106 supplies high power to the outlets 108 and 110. Additionally, based on the load detection of the power inverter 106 and/or the status of the plug-in detector 120, the security handler 122 starts an idle timer. In some examples, the idle timer is thirty minutes. In some examples, to provide the higher power output, the powertrain control module 116 controls the powertrain 105 increase the revolutions per minute (RPM) of the engine.

As indicated by "B" on FIG. 3, the security handler 122 transitions from the UHIVAC state 304 to the partially secured high power voltage alternating current (PSHIVAC) state 306 when the user indicates, via the instrument panel cluster 104, to enter the secure high power mode. The security handler 122 makes this transition when a physical key is used to control the ignition switch 202.

As indicated by "C" on FIG. 3, the security handler 122 transitions from the UHIVAC state 304 to the secured high power voltage alternating current (SHIVAC) state 308 when the user indicates, via the instrument panel cluster 104, to enter the secure high power mode. The security handler 122 makes this transition when a passive key fob is used to enable the ignition switch 202.

As indicated by "D" on FIG. 3, the security handler 122 transitions from the UHIVAC state 304 to the LVAC state 302 when (a) the gear selector is shifted out of the "PARK" position, (b) one of the switches 112 and 114 is toggled to the lower power setting, (c) power is not available (e.g., the vehicle 100 does not have enough fuel and/or battery charge to support supplying high power), or (d) the idle timer expires.

In the PSHIVAC state 306, the security handler 122 continues to run the engine despite the position of the ignition switch 202. Additionally, the security handler 122, the ignition switch 202, monitors whether the key is in the ignition switch 202. The instrument panel cluster 104 displays a reminder to remove the key.

As indicated by "E" on FIG. 3, the security handler 122 transitions from the PSHIVAC state 306 to the LVAC state 302 when (a) the gear selector is shifted out of the "PARK" position, (b) one of the switches 112 and 114 is toggled to the lower power setting, (c) power is not available (e.g., the vehicle 100 does not have enough fuel and/or battery charge to support supplying high power), or (d) the idle timer expires.

As indicated by "F" on FIG. 3, the security handler 122 transitions from the PSHIVAC state 306 to the SHIVAC state 308 when the key is removed from the ignition switch 202.

In the SHIVAC state 308, the power inverter 106 continues to supply high power to the outlets 108 and 110. The security handler 122 sets the powertrain control module 116 to the non-motive mode.

As indicated by "G" on FIG. 3, the security handler 122 transitions from the SHIVAC state 308 to the authentication (AUTH) state 310 when one of the switches 112 and 114 is toggled to the low power setting.

In the AUTH state 310, the power inverter 106 supplies low power to the outlets 108 and 110. The security handler 122 monitors the state of the ignition switch 202 for an authorized key (e.g., a bladed key, a passive start key, etc.) to set the ignition switch 202 to the "RUN" position.

As indicated by "H" on FIG. 3, the security handler 122 transitions from the AUTH state 310 to the LVAC state 302 when the authorized key sets the ignition switch 202 to the "RUN" position.

As indicated by "I" on FIG. 3, the security handler 122 transitions from the AUTH state 310 to the post high power voltage alternating current (PHIVAC) state 312 when (a) the authorized key does not set the ignition switch 202 to the "RUN" position or (b) an authorized passive fob is not detected.

In the PHIVAC state 312, the power inverter 106 supplies low power to the outlets 108 and 110. Additionally, the security handler 122 starts an authentication timer. In some examples, the authentication timer is sixty seconds. In some examples, the instrument panel cluster 104 displays a warning to insert the authorized key or produce the authorized passive key fob.

As indicated by "J" on FIG. 3, the security handler 122 transitions from the PHIVAC state 312 to the AUTH state 310 when the authorized key sets the ignition switch 202 to the "RUN" position or the authorized passive key fob is within range of the vehicle 100.

As indicated by "K" on FIG. 3, the security handler 122 transitions from the PHIVAC state 312 to the LVAC state 302 when the authentication timer ends.

As indicated by "L" on FIG. 3, the security handler 122 transitions from the SHIVAC state 308, the AUTH state 310 and/or the PHIVAC state 312 to the LVAC state 302 in response to (a) the idle time ending, (b) power not being available to support high power mode, or (c) the gear selector being shifted from the "PARK" position.

Figure 4:
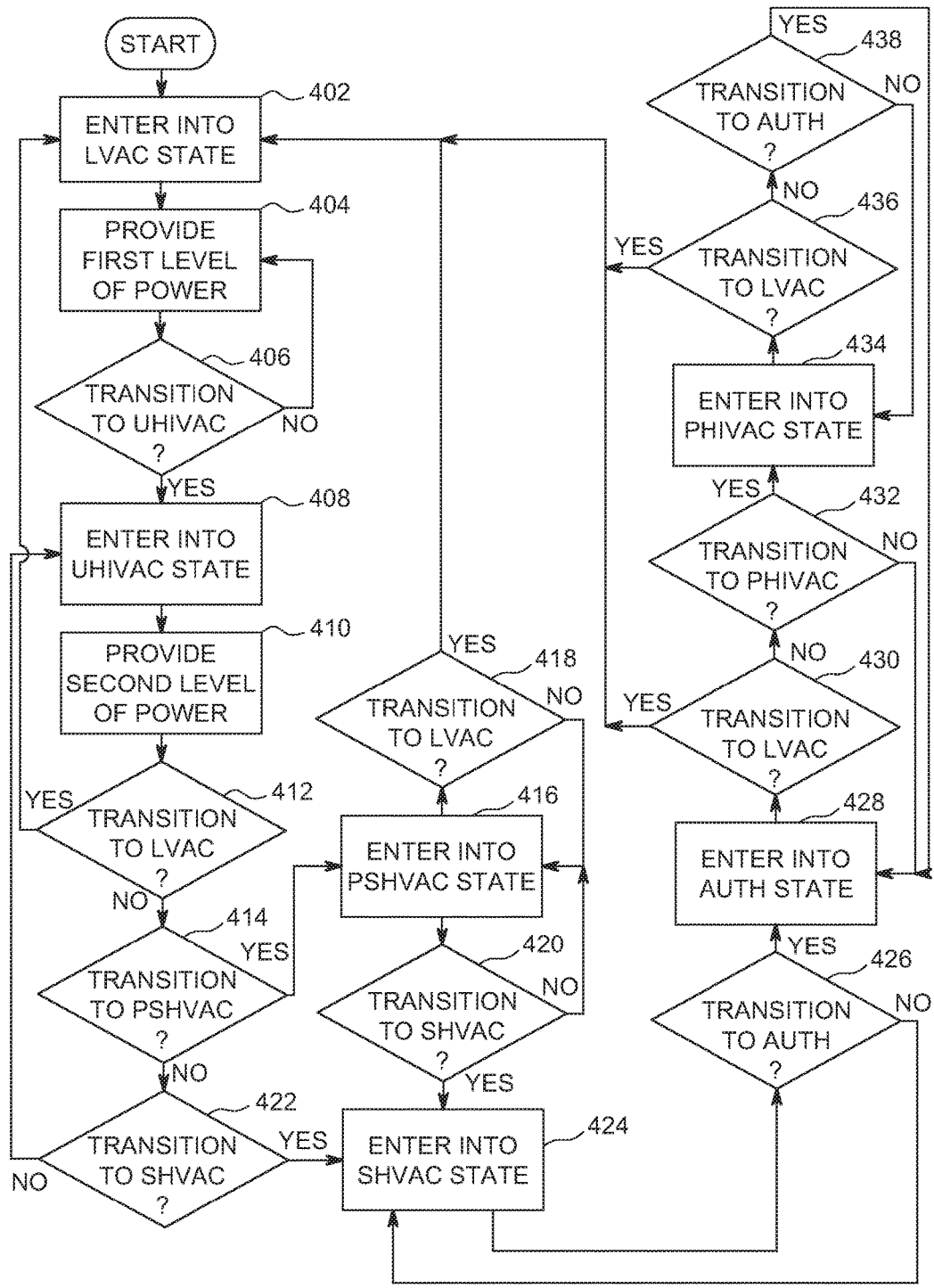
FIG. 4 is a flowchart of a method to provide power through a secure idle, which may be implemented by the electronic components of FIG. 2.

FIG. 4 is a flowchart of a method to provide power through a secure idle, which may be implemented by the electronic components 200 of FIG. 2. Initially, at block 402, the security handler 122 enters into the LVAC state 302. At block 404, the security handler 122 instructs the power inverter 106 to provide low power (e.g., 100-400 Watts, etc.). At block 406, the security handler 122 determines whether to enter the UHIVAC state 304. The security handler 122 determines to enter the UHIVAC state 304 when (a) the gear selector is in the "PARK" position, (b) the ignition switch 202 is in the "RUN" position, (c) one of the switches 112 and 114 is toggled to the high power mode, (d) power is available (e.g., the vehicle 100 has enough fuel and/or battery charge to support supplying high power), and (e) the UHIVAC state 304 is enabled (e.g., via the instrument panel cluster 104). In response to determining to enter the UHIVAC state 304, the method continues to block 408. Otherwise, in response to determining not to enter the UHIVAC state 304, the method returns to block 404.

At block 408, the security handler 122 enters into the UHIVAC state 304. At block 410, the security handler 122 instructs the power inverter 106 to provide high power (e.g., at least 2000 Watts, etc.) to the outlets 108 and 110. At block 412, the security handler 122 determines whether to enter the LVAC state 302. The security handler 122 determines to enter the LVAC state 302 when a) the gear selector is shifted out of the "PARK" position, (b) one of the switches 112 and 114 is toggled to the lower power setting, (c) power is not available (e.g., the vehicle 100 does not have enough fuel and/or battery charge to support supplying high power), or (d) the idle timer expires. In response to determining to enter the LVAC state 302, the method returns to block 402. Otherwise, in response to determining not to enter the LVAC state 302, the method continues to block 414.

At block 414, the security handler 122 determines whether to transition to the PSHIVAC state 306. The security handler 122 determines to transition to the PSHIVAC state 306 when the user indicates, via the instrument panel cluster 104, to enter the secure high power mode with a vehicle 100 that uses a physical key is used to control the ignition switch 202. In response to determining to enter the PSHIVAC state 306, the method continues to block 416. Otherwise, in response to determining not to enter the PSHIVAC state 306, the method continues to block 422.

At block 416, the security handler 122 enters the PSHIVAC state 306. In the PSHIVAC state 306, the powertrain control module 116 continues to run the engine even when the ignition switch 202 is not in the "ON" position. At block 418, the security handler 122 determines whether to enter the LVAC state 302. The security handler 122 determines to enter the LVAC state 302 when (a) the gear selector is shifted out of the "PARK" position, (b) one of the switches 112 and 114 is toggled to the lower power setting, (c) power is not available (e.g., the vehicle 100 does not have enough fuel and/or battery charge to support supplying high power), or (d) the idle timer expires. In response to determining to enter the LVAC state 302, the method returns to block 402. Otherwise, in response to determining not to enter the LVAC state 302, the method returns to block 416.

At block 420, the security handler 122 determines whether to enter the SHIVAC state 308. The security handler 122 determines to enter the SHIVAC state 308 when the key is removed from the ignition switch 202. In response to determining to enter the SHIVAC state 308, the method continues to block 424. Otherwise, in response to determining not to enter the SHIVAC state 308, the method returns to block 416.

At block 422, the security handler 122 determines whether to enter the SHIVAC state 308. The security handler 122 determines to enter the SHIVAC state 308 when the user indicates, via the instrument panel cluster 104, to enter the secure high power mode and the passive key fob is in the vicinity of the vehicle 100. In response to determining to enter the SHIVAC state 308, the method continues to block 424. Otherwise, in response to determining not to enter the SHIVAC state 308, the method returns to block 408.

At block 424, the security handler 122 sets the powertrain control module 116 to the non-motive mode. In the non-motive mode, the powertrain control module 116 shuts down the engine when the gear selector is shifted out of the "PARK" setting or the vehicle 100 is moving. At block 426, the security handler 122 determines whether to enter the AUTH state 310. The security handler 122 determines to enter the AUTH state 310 when one of the switches 112 and 114 is toggled to the low power setting. In response to determining to enter the AUTH state 310, the method continues to block 428. Otherwise, in response to determining not to enter the AUTH state 310, the method returns to block 424.

At block 428, the security handler 122 enters into the AUTH state 310. The security handler 122 instructs the power inverter 106 to supply low power to the outlets 108 and 110. Additionally, the security handler 122 monitors the ignition switch 202 for an authorized key to set the ignition switch 202 to the "RUN" position. At block 430, the security handler 122 determines whether to enter the LVAC state 302. The security handler 122 determines to enter the LVAC state 302 when (a) the authorized key sets the ignition switch 202 to the "RUN" position, (b) the idle time ending, (c) power not being available to support high power mode, or (d) the gear selector being shifted from the "PARK" position. In response to determining to enter the LVAC state 302, the method returns to block 402. Otherwise, in response to determining not to enter the LVAC state 302, the method continues to block 432. At block 432, the security handler 122 determines whether to enter the PHIVAC state 312. The security handler 122 determines to enter the PHIVAC state 312 when (a) the authorized key does not set the ignition switch 202 to the "RUN" position or (b) an authorized passive fob is not detected. In response to determining to enter the PHIVAC state 312, the method continues to block 434. Otherwise, in response to determining not to enter the PHIVAC state 312, the method returns to block 428.

At block 434, the security handler 122 instructs the power inverter 106 to supply low power to the outlets 108 and 110. Additionally, the security handler 122 starts the authentication timer. At block 436, the security handler 122 determines whether to enter the LVAC state 302. The security handler 122 determines to enter the LVAC state 302 when (a) the authorized key sets the ignition switch 202 to the "RUN" position, (b) the idle time ending, (c) power not being available to support high power mode, (d) the gear selector being shifted from the "PARK" position, or (e) the authentication timer ends. In response to determining to enter the LVAC state 302, the method returns to block 402. Otherwise, in response to determining not to enter the LVAC state 302, the method continues to block 438. At block 438, the security handler 122 determines whether to enter the AUTH state 310. The security handler 122 determines to enter the AUTH state 310 when the authorized key sets the ignition switch 202 to the "RUN" position or the authorized passive key fob is within range of the vehicle 100 In response to determining to enter the AUTH state 310, the method returns to block 428. Otherwise, in response to determining not to enter the AUTH state 310, the method returns to block 434.

The flowchart of FIG. 4 is representative of machine readable instructions stored in memory (such as the memory 206 of FIG. 2) that comprise one or more programs that, when executed by a processor (such as the processor 206 of FIG. 2), cause the vehicle 100 to implement the example security handler 122 and/or, more generally, the example powertrain control module 116 of FIGS. 1 and 2. Further, although the example program(s) is/are described with reference to the flowchart illustrated in FIG. 4, many other methods of implementing the example security handler 122 and/or, more generally, the example powertrain control module 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an outlet external to the vehicle;
a power inverter dedicated to supplying AC power to the outlet; and
a powertrain control module to:
control the power inverter to supply a first power level when a switch is in a first position and a second power level when the switch is in a second position;
after entering a secure mode, control an engine to remain idling when an ignition switch is off; and
provide, via an instrument panel cluster, a warning when a plug-in detector detects a plug in the outlet and a gear selector is shifted out of park.

2. The vehicle of claim 1, including a second switch.

3. The vehicle of claim 1, wherein when in the secure mode, the powertrain control module is to terminate the engine in response to detecting the gear selector being shifted from park.

4. The vehicle of claim 1, wherein the outlet is a first outlet, and including a second outlet internal to the vehicle, the power inverter dedicated to supplying the AC power to the first and second outlets.

5. The vehicle of claim 1, wherein the outlet includes the plug-in detector.

6. The vehicle of claim 2, including a body control module, and wherein to enter the secure mode, the body control module is to detect the ignition switch is off, a key is removed from the ignition switch, and a position of the second switch is indicative of the secure mode.

7. The vehicle of claim 6, wherein, when in the secure mode, the powertrain control module is to control the power inverter to supply the second power level.

8. The vehicle of claim 2, wherein the powertrain control module is to control the power inverter to supply the first power level when the second switch is in a first position and the second power level when the second switch is in a second position.

9. The vehicle of claim 2, wherein the switch is external to the vehicle and the second switch is internal to the vehicle.

10. A vehicle comprising:
an outlet external to the vehicle;
a power inverter dedicated to supplying AC power to the outlet; and
a powertrain control module to:
control the power inverter to supply a first power level when a switch is in a first position and a second power level when the switch is in a second position;
after entering a secure mode, control an engine to remain idling when an ignition switch is off;
maintain an idle timer when the power inverter is supplying the second power level; and
when the idle timer expires, control the power inverter to supply the first power level.

11. The vehicle of claim 10, wherein the powertrain control module is to provide, via an instrument panel cluster, a warning when a plug-in detector detects a plug in the outlet and a gear selector is shifted out of park.

12. The vehicle of claim 10, wherein the idle timer is set for at least thirty minutes.

13. A vehicle comprising:
an outlet external to the vehicle;
a power inverter dedicated to supplying AC power to the outlet; and
a powertrain control module to:
control the power inverter to supply a first power level when a switch is in a first position and a second power level when the switch is in a second position, wherein the first power level is between 100 Watts and 400 Watts; and
after entering a secure mode, control an engine to remain idling when an ignition switch is off.

14. A vehicle comprising:
an external outlet;
a power inverter dedicated to supplying AC power to the external outlet; and
a powertrain control module to:
control the power inverter to supply a first power level when a switch is in a first position and a second power level of at least 2000 Watts when the switch is in a second position; and
after entering a secure mode, idle an engine when an ignition switch is off.

15. A vehicle comprising:
an outlet external to the vehicle;
a power inverter dedicated to supplying AC power to the outlet; and
a powertrain control module to:
control the power inverter to supply a first power level when a switch is in a first position and a second power level when the switch is in a second position; and
after entering a secure mode, control an engine to remain idling when an ignition switch is off;
a second switch;
a body control module, wherein, to enter the secure mode, the body control module is to detect the ignition switch is off, a key is removed from the ignition switch, and a position of the second switch is indicative of the secure mode; and
an instrument panel cluster to prompt a user to remove the key from the ignition switch when the second switch is toggled to the secure position.

16. The vehicle of claim 15, wherein the second switch is a physical switch.

17. The vehicle of claim 15, wherein the second switch is a soft switch provided by an interactive center console display in the vehicle.

18. A vehicle comprising:
an outlet external to the vehicle;
a power inverter dedicated to supplying AC power to the outlet; and
a powertrain control module to:
control the power inverter to supply a first power level when a switch is in a first position and a second power level when the switch is in a second position; and
after entering a secure mode, control an engine to remain idling when an ignition switch is off
a second switch;
a body control module, and wherein to enter the secure mode, the body control module is to detect the ignition switch is off, a key is removed from the ignition switch, and a position of the second switch is indicative of the secure mode; and
an instrument panel cluster to prompt a user to insert the key into the ignition switch when the second switch is toggled to an unsecure position.

19. The vehicle of claim 18, wherein the second switch is a physical switch.

20. The vehicle of claim 18, wherein the second switch is a soft switch provided by an interactive center console display in the vehicle.

* * * * *